(12) United States Patent
Li et al.

(10) Patent No.: US 9,976,021 B2
(45) Date of Patent: May 22, 2018

(54) COMPOSITIONS COMPRISING EPDM AND A POLYOLEFIN ELASTOMER, PREPARATION AND USE THEREOF

(75) Inventors: Liang Li, Houston, TX (US); Milind B. Joshi, Karnataka (IN); Jian Shen, Shanghai (CN); Eric P. Jourdain, Rhode Saint Genese (BE); Virendra K. Tiwari, Karnataka (IN); Jun Tong, Shanghai (CN); Pradeep P. Patki, Karnataka (IN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 854 days.

(21) Appl. No.: 14/377,716

(22) PCT Filed: Mar. 9, 2012

(86) PCT No.: PCT/CN2012/000292
§ 371 (c)(1),
(2), (4) Date: Oct. 28, 2014

(87) PCT Pub. No.: WO2013/131207
PCT Pub. Date: Sep. 12, 2013

(65) Prior Publication Data
US 2015/0056392 A1    Feb. 26, 2015

(51) Int. Cl.
*C08L 23/16*    (2006.01)

(52) U.S. Cl.
CPC ........... *C08L 23/16* (2013.01); *Y10T 428/139* (2015.01)

(58) Field of Classification Search
CPC ....... C08L 23/16; C08L 23/12; Y10T 428/139
USPC ....................................................... 428/36.9
See application file for complete search history.

(56) References Cited

U.S. PATENT DOCUMENTS

| 2003/0104236 A1 | 6/2003 | Nguyen et al. |
| 2011/0118404 A1 | 5/2011 | Jung et al. |

FOREIGN PATENT DOCUMENTS

| CN | 1542042 A | 3/2004 | |
| CN | 1542042 A | * 11/2004 | ............. C08L 23/12 |
| CN | 102070845 A | 5/2011 | |

OTHER PUBLICATIONS

CN1542042A—machine translation.*

* cited by examiner

*Primary Examiner* — Ling Siu Choi
*Assistant Examiner* — Ronald Grinsted

(57) ABSTRACT

Provided are compositions comprising: (a) an ethylene-propylene-diene terpolymer having a Mooney viscosity [ML (1+4) 125° C.] of about 25 to about 300 and an ethylene content of at least about 60 wt % of the ethylene-propylene-diene terpolymer; and (b) a polyolefin elastomer. The presence of the polyolefin elastomer improves rheological properties of the composition to an extent that does not significantly compromise other properties, such as tensile strength at break and compression set.

23 Claims, 6 Drawing Sheets

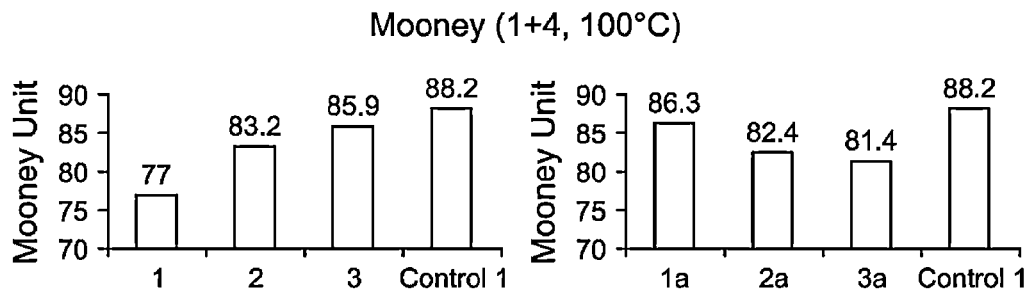
Fig. 1a
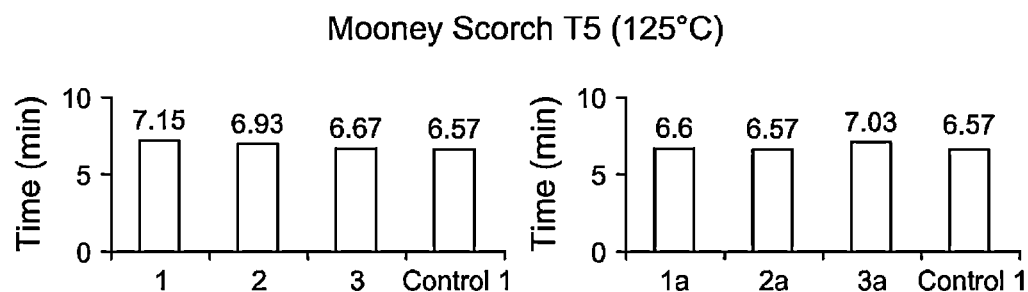
Fig. 1b
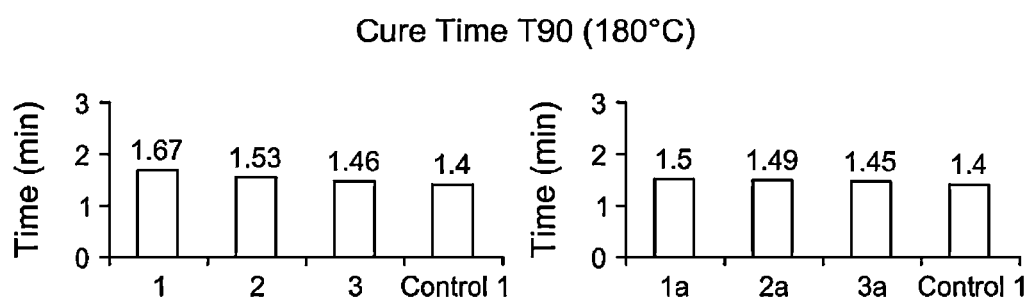
Fig. 1c
Fig. 1

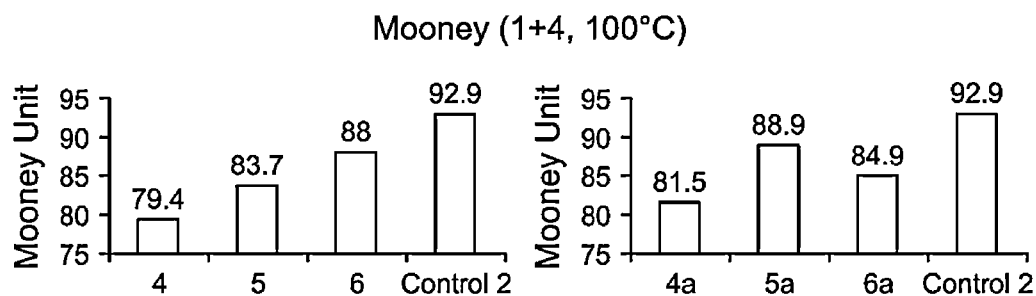
Fig. 4a
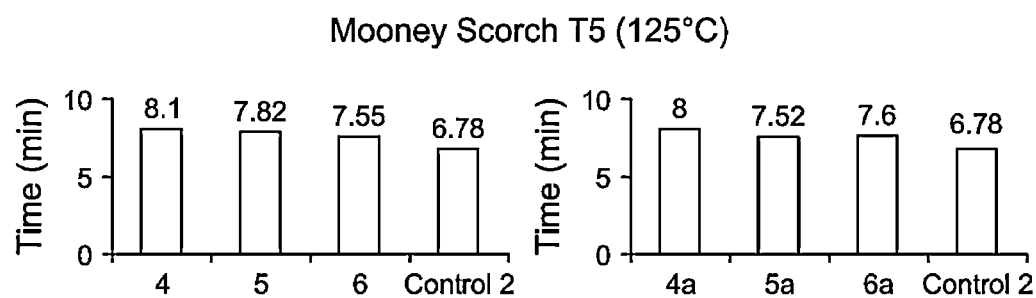
Fig. 4b
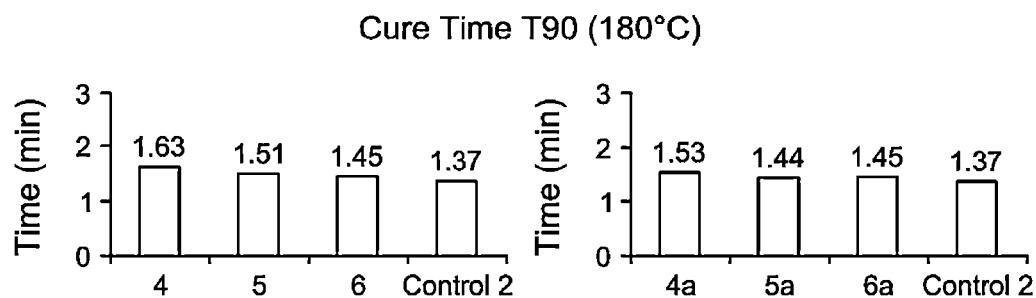
Fig. 4c
Fig. 4

COMPOSITIONS COMPRISING EPDM AND A POLYOLEFIN ELASTOMER, PREPARATION AND USE THEREOF

CROSS REFERENCE TO RELATED APPLICATIONS

This application is a National Stage Application of International Application No. PCT/CN2012/000292, filed Mar. 9, 2012. This application is related to U.S. Pat. No. 8,609,760, filed Nov. 18, 2009.

FIELD OF THE PRESENT INVENTION

This invention relates to polymer compositions. More particularly, this invention relates to compositions comprising an ethylene-propylene-diene terpolymer and a polyolefin elastomer, methods of making the same, and articles made therefrom.

BACKGROUND OF THE PRESENT INVENTION

Properties of compositions comprising an ethylene-propylene-diene terpolymer (EPDM) have a direct effect on their processability for end use. Consumer applications require various adjustments of compositions comprising EPDM by adding components that are compatible with the EPDM to achieve certain properties. Rheological properties can be improved by incorporating a small amount of an EPDM with a low Mooney viscosity [ML(1+4) 125° C.], such as below 25, into a common EPDM with a relatively high Mooney viscosity [ML(1+4) 125° C.] (usually above 60) to reach a greatly increased flowability. However, such compositions usually result in relatively high cost for extensive use.

U.S. Publication No. 2011-0118404 A1 relates to natural rubber blends, methods for making the same, and articles made therefrom. The natural rubber blend includes at least one propylene copolymer containing ethylene-derived units. The natural rubber blend can further include one or more reinforcing fillers, such as carbon black. The presence of the propylene copolymer is said to improve the ozone resistance and aging properties of the natural rubber gum stock.

Xiao Sheng, "Use of specialty elastomer Vistamaxx VM1100 in an EPDM gum stock", Rubber Industry, p 483-486, Issue 8, Vol. 54, 2007, reports the addition of certain propylene-based elastomers into EPDM gum stock containing EPDM with a Mooney viscosity [ML(1+4) 125° C.] around 80 and EPDM with a lower Mooney viscosity [ML(1+4) 125° C.] between 17 and 23 to partially replace the EPDM with the lower Mooney viscosity in an amount of no more than 20 phr relative to the total amount of both EPDM components. This replacement is said to reduce production cost while substantially maintaining heat aging and compression set properties of the original gum stock. The reference also concludes that rheological properties of the gum stock during processing, e.g., extrusion, would not be obviously changed by the propylene-based elastomer.

Given the rapidly growing demand and the relatively tight supply of EPDM raw materials with a low Mooney viscosity in recent years, it would be desirable to have an alternative to EPDM with a low Mooney viscosity that would also serve to improve flowability of compositions comprising EPDM. Applicants have found that certain polyolefin elastomers, particularly propylene-based elastomers, can provide enhanced flowability of compositions comprising EPDM with a relatively high Mooney viscosity, especially when used with an amount of, such as less than about 20 phr relative to the EPDM. It is a more cost effective way to obtain better flowability of compositions comprising EPDM without significantly compromising other properties, such as tensile strength at break and compression set, thus making the inventive compositions particularly advantageous to subsequent applications, such as extrusion.

SUMMARY OF THE PRESENT INVENTION

Compositions comprising EPDM, a polyolefin elastomer, methods of making the same, and articles made therefrom are provided. In one embodiment, the present invention encompasses a composition comprising: (a) an ethylene-propylene-diene terpolymer having a Mooney viscosity [ML (1+4) 125° C.] of about 25 to about 300 and an ethylene content of at least about 60 wt % of the EPDM; and (b) a polyolefin elastomer.

In one embodiment, the present invention relates to a method for preparing a composition, comprising the steps of (a) combining (i) an EPDM having a Mooney viscosity [ML(1+4) 125° C.] of about 25 to about 300 and an ethylene content of at least about 60 wt % of the EPDM with (ii) a polyolefin elastomer, and (b) forming the composition.

The present invention also encompasses an article comprising any of the compositions described herein or made according to any method disclosed herein. Preferably, the article is an extruded article, molded article, hose, sheet, film, or jacket.

In one embodiment, the present invention relates to a method for reducing the Mooney viscosity of a composition, comprising the steps of: (a) combining (i) an ethylene-propylene-diene terpolymer having a Mooney viscosity [ML (1+4) 125° C.] of about 25 to about 300 and an ethylene content of at least about 60 wt % of the ethylene-propylene-diene terpolymer with (ii) a polyolefin elastomer, and (b) forming the composition.

In a preferred embodiment, the polyolefin elastomer is a propylene-based elastomer containing at least about 60 wt % propylene-derived units and about 5 to about 25 wt % ethylene-derived units, based on total weight of the propylene-based elastomer, wherein the propylene-based elastomer has a heat of fusion of less than about 80 J/g. In one preferred embodiment, the composition has a Mooney viscosity [ML(1+4) 100° C.] that is about 0 to about 15 lower than the Mooney viscosity [ML(1+4) 100° C.] of a composition free of the polyolefin elastomer but is otherwise identical in terms of its constituents.

BRIEF DESCRIPTION OF THE DRAWINGS

FIG. 1 depicts the Mooney viscosity [ML(1+4) 100° C.] (FIG. 1*a*), Mooney Scorch expressed as time for the Mooney viscosity to rise by 5 units (T5) at 125° C. (FIG. 1*b*), and cure time for reaching 90% vulcanization curve (T90) at 180° C. (FIG. 1*c*), for each of the inventive Samples 1-3 and Samples 1a-3a compared with the first comparative example, at an EPDM amount of 25 wt % of the composition.

FIG. 4 depicts the Mooney viscosity [ML(1+4) 100° C.] (FIG. 4a), Mooney Scorch expressed as time for the Mooney viscosity to rise by 5 units (T5) at 125° C. (FIG. 4b), and cure time for reaching 90% vulcanization curve (T90) at 180° C. (FIG. 4c) for each of the inventive Samples 4-6 and Samples 4a-6a compared with the second comparative example, at an EPDM amount of 20 wt % of the composition.

DETAILED DESCRIPTION OF THE PRESENT INVENTION

Figure 2:
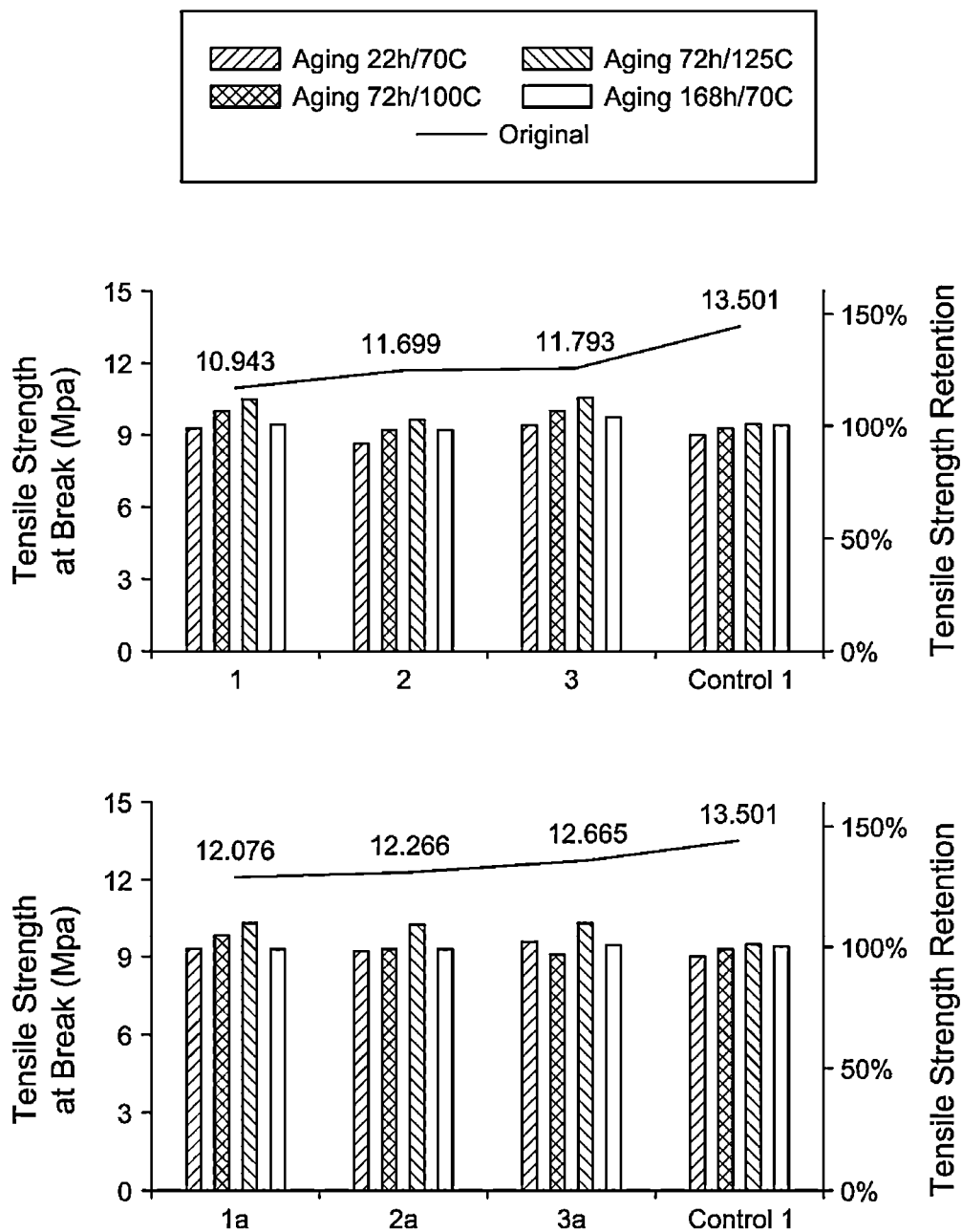
FIG. 2 depicts the tensile strength at break and tensile strength retention after aging for each of the inventive Samples 1-3 and Samples 1a-3a compared with the first comparative example, at an EPDM amount of 25 wt % of the composition.

Various specific embodiments, versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the present inventions defined by the claims. The use of headings is for purposes of convenience only and does not limit the scope of the present invention.

As used herein, a "polymer" may be used to refer to homopolymers, copolymers, interpolymers, terpolymers, etc.

As used herein, when a polymer is referred to as comprising a monomer, the monomer is present in the polymer in the polymerized form of the monomer or in the derivative form of the monomer.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers. The terms may be used interchangeably with the term "rubber(s)."

As used herein, "phr" is parts per hundred rubber or "parts", and is a measure common in the art wherein components of a composition are measured relative to a major elastomer component, based upon 100 parts by weight of the elastomer(s) or rubber(s).

As used herein, a composition "free of" a component refers to a composition substantially devoid of the component, or comprising the component in an amount of less than about 0.01 wt %, by weight of the total composition.

The present invention relates to a composition comprising an ethylene-propylene-diene terpolymer (EPDM) and a polyolefin elastomer. The polyolefin elastomer, when used with a certain amount, such as less than about 150 phr, less than about 100 phr, less than about 50 phr, less than about 20 phr relative to the EPDM, can achieve a reduced Mooney viscosity for the composition in a cost effective way without greatly compromising other properties.

In one embodiment, the present invention encompasses a composition comprising: a) an ethylene-propylene-diene terpolymer (EPDM) having a Mooney viscosity [ML(1+4) 125° C.] of about 25 to about 300 and an ethylene content of at least about 60 wt % of the EPDM; and b) a polyolefin elastomer. In a preferred embodiment, the polyolefin elastomer is a propylene-based elastomer comprising at least about 60 wt % propylene-derived units and about 5 to about 25 wt % ethylene-derived units, based on total weight of the propylene-based elastomer, wherein the propylene-based elastomer has a heat of fusion of less than about 80 J/g. Preferably, the composition has a Mooney viscosity [ML (1+4) 100° C.] about 0 to about 15 lower than the Mooney viscosity [ML(1+4) 100° C.] of a composition free of the polyolefin elastomer but is otherwise identical in terms of its constituents.

Ethylene-Propylene-Diene Terpolymer

Embodiments of the present invention include an ethylene-propylene-diene terpolymer (EPDM). In one embodiment, the EPDM has a Mooney viscosity (ML [1+4] 125° C.) of about 25 to about 300 and an ethylene content of at least about 60 wt % of the EPDM. In another embodiment, the EPDM has a Mooney viscosity (ML [1+4] 125° C.) of about 60 to about 90, and preferably an ethylene content of about 60 to about 75 wt % of the EPDM. In yet another embodiment, the EPDM has a Mooney viscosity (ML [1+4] 125° C.) of about 70 to about 75, and preferably an ethylene content of about 65 to about 70 wt % of the EPDM. In one embodiment, the EPDM has a Mooney viscosity (ML [1+4] 125° C.) of from about 25 to about 300, as determined according to ASTM D1646, preferably from about 50 to about 150, more 60 to about 90, and most preferably from about 70 to about 75. In certain embodiments, the EPDM has a Mooney viscosity (ML [1+4] 125° C.) of from about 25, about 30, about 35, about 40, about 45, about 50, about 55, about 60, about 65, about 70, to about 75, about 80, about 85, about 90, about 95, about 100, about 105, about 110, about 115, about 120, about 125, about 130, about 135, about 140, about 145, about 150, about 155, about 160, about 165, about 170, about 175, about 180, about 185, about 190, about 195, about 200, about 205, about 210, about 215, about 220, about 225, about 230, about 235, about 240, about 245, about 250, about 255, about 260, about 265, about 270, about 275, about 280, about 285, about 290, about 295, or about 300, or in the range of any of the combinations of the values recited herein. In some embodiments, the EPDM has an ethylene content of from about 60, about 61, about 62, about 63, about 64, about 65, to about 70, about 71, about 72, about 73, about 74, about 75, about 76, about 77, about 78, about 79, about 80, about 81, about 82, about 83, about 84, about 85, about 86, about 87, about 88, about 89, about 90, about 91, about 92, about 93, about 94, about 95, about 96, about 97, about 98, or about 99 wt % of the EPDM, or in the range of any of the combinations of the values recited herein. In one embodiment, the EPDM is present in the composition of the present invention in an amount of about 10 to about 45 wt % of the composition. In certain embodiments, the EPDM is present in an amount of about 10 to about 15, about 20, about 25, about 30, about 35, about 40, about 45, or about 50 wt % of the composition.

In one embodiment, the EPDM comprises at least 60 wt % ethylene-derived units, preferably from about 60 to about 75 wt % ethylene-derived units, and more preferably from about 65 to about 70 wt % ethylene-derived units. The amount of the diene-derived units (or "diene") in the EPDM may vary from about 0.3 to about 15 wt %, preferably from about 0.3 to about 10 wt %, more preferably from about 0.3 to about 8 wt %, and most preferably from about 0.3 to about 6 wt %. Suitable dienes include, for example: 1,4-hexadiene, 1,6-octadiene, 5-methyl-1,4-hexadiene, 3,7-dimethyl-1,6-octadiene, dicyclopentadiene (DCPD), ethylidiene norbornene (ENB), norbornadiene, 5-vinyl-2-norbornene (VNB), and combinations thereof. The diene is most preferably ENB. Ethylene content is determined by ASTM D3900, and is not corrected for diene content. ENB content incorporated in the polymer is determined by FTIR, ASTM D6047. The diene content of a terpolymer comprising VNB is preferably measured via $^1$H NMR. These methods measure available unsaturation. Thus, the measured incorporation may be lower than the actual incorporation because dienes having pendant unsaturated moieties have been converted, e.g., by hydrogen, and are not detected in the measurement. If both ENB and VNB are present, $^{13}$C NMR is preferably used to determine diene content.

The EPDM polymers described herein preferably have a MWD of from about 2 to about 20. As used herein, MWD ($M_w/M_n$) is determined according to methods well known in the art, for example by GPC (Gel Permeation Chromatography) on a Waters 150 gel permeation chromatograph equipped with a differential refractive index (DRI) detector and a Chromatix KMX-6 on line light scattering photometer. The system is used at 135° C. with 1,2,4-trichlorobenzene as the mobile phase using Shodex (Showa Denko America, Inc) polystyrene gel columns 802, 803, 804, and 805. This technique is discussed in "Liquid Chromatography of Polymers and Related Materials III," J. Cazes editor, Marcel Dekker, 1981, p. 207, which is incorporated herein by reference. No corrections for column spreading are employed; however, data on generally accepted standards, e.g., National Bureau of Standards Polyethylene 1484 and anionically produced hydrogenated polyisoprenes (alternating ethylene-propylene copolymers) demonstrate that such corrections on MWD are less than 0.05 units. $M_w/M_n$ is calculated from elution times. The numerical analyses are performed using the commercially available Beckman/CIS customized LALLS software in conjunction with the standard Gel Permeation package. Reference to $M_w/M_n$ implies that the $M_w$ is the value reported using the LALLS detector and $M_n$ is the value reported using the DRI detector described above.

Preferred EPDM polymers have a triad tacticity, as measured by $^{13}$C NMR, of 75% or greater, 80% or greater, 82% or greater, 85% or greater, or 90% or greater. The triad tacticity of a polymer is the relative tacticity of a sequence of three adjacent propylene units, a chain consisting of head to tail bonds, expressed as a binary combination of m and r sequences. It is usually expressed for semi-amorphous copolymers as the ratio of the number of units of the specified tacticity to all of the propylene triads in the copolymer. The triad tacticity (mm fraction) of an EPDM polymer can be determined from a $^{13}$C NMR spectrum of the EPDM polymer and the following formula:

mm Fraction=PPP(mm)/(PPP(mm)+PPP(mr)+ PPP(rr)), where PPP(mm), PPP(mr) and PPP(rr) denote peak areas derived from the methyl groups of the second units in the following three propylene unit chains consisting of head-to-tail bonds:

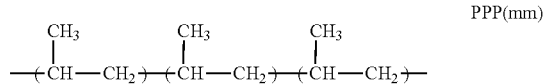

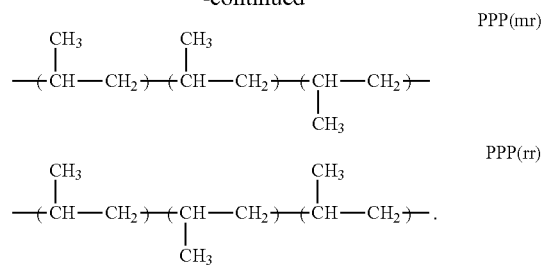

The $^{13}$C NMR spectrum of the EPDM polymer is measured as described in U.S. Pat. No. 5,504,172. The spectrum relating to the methyl carbon region (19-23 parts per million (ppm)) can be divided into a first region (21.2-21.9 ppm), a second region (20.3-21.0 ppm and a third region (19.5-20.3 ppm). Each peak in the spectrum was assigned with reference to the article in the journal Polymer, Volume 30 (1989), page 1350. In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm). The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP (mm), PPP(mr) and PPP(rr) can be evaluated, and hence the triad tacticity of the propylene unit chain consisting of head-to-tail bonds can be determined.

In a preferred embodiment, the EPDM polymer may have a heat of fusion ($\Delta H_f$) which is greater than or equal to about 0.5 Joules per gram (J/g), and is less than or equal to about 70 J/g, preferably less than or equal to about 50 J/g, preferably less than or equal to about 35 J/g, preferably less than or equal to about 25 J/g. Preferably the EPDM polymers also have a heat of fusion that is greater than or equal to about 1 J/g, preferably greater than or equal to about 2.5 J/g, preferably greater than or equal to about 5 J/g. Thermodynamic heat of fusion data may be determined by differential scanning calorimetry (DSC), the procedure for which is as follows. About 6 to about 10 mg of a sheet of the polymer pressed at approximately 200° C. to 230° C. and cooled at ambient conditions (25° C. and 50% humidity for 24 hours) is removed with a punch die. This sample is annealed at room temperature for 80 to 100 hours. At the end of the annealing period, the sample is placed in a differential scanning calorimeter (Perkin Elmer 7 Series Thermal Analysis System) and cooled to −50° C. to −70° C. The sample is then heated at a rate of 20° C./min to a final temperature of 200° C. to 220° C. The thermal output is recorded as the area under the melting peak curve of the sample, which is typically peaked at 30° C. to 175° C., and occurs between the temperatures of 0° C. and 200° C. The thermal output in joules is a measure of the heat of fusion.

In a preferred embodiment, the EPDM polymer has a % crystallinity of from 0.5 to 40, preferably 1 to 30, and more preferably 5 to 25 wherein % crystallinity is determined according to the DSC procedure described herein. For use herein, the crystallinity of the propylene-ethylene polymer can also be expressed in terms of percentage of crystallinity. The thermal energy for the highest order of polypropylene is estimated at 189 J/g (i.e., 100% crystallinity is equal to 189 J/g). In another embodiment, the propylene-ethylene polymer of the present disclosure preferably has a crystallinity of less than 40%, preferably about 0.25% to about 25%, more preferably from about 0.5% to about 22%, and most preferably from about 0.5% to about 20%.

In addition to this level of crystallinity, the EPDM polymer preferably has a single broad melting transition. The melting point is defined as the temperature of the greatest heat absorption within the range of melting of the sample. However, the EPDM polymer may show secondary melting peaks adjacent to the principal peak, but for purposes herein, such secondary melting peaks are considered together as a single melting point, with the highest of these peaks being considered the melting point ($T_m$) of the propylene-ethylene polymer. The EPDM polymer preferably has a melting point of from about 25° C. to 105° C., preferably from 25° C. to about 85° C., preferably from 25° C. to about 75° C., preferably about 25° C. to about 65° C., more preferably about 30° C. to about 80° C., more preferably about 30° C. to about 70° C. and more preferably about 30° C. to about 60° C.

A suitable EPDM polymer is commercially available under the trade name VISTALON™ (ExxonMobil Chemical Company, Houston, Tex., USA).

Polyolefin Elastomer

As used herein, the term "polyolefin elastomer" refers to a polymeric elastomer made up of at least 50 wt % olefin-derived units, examples of which include ethylene and $C_{3-16}$ alpha-olefins, and combinations thereof. Examples of the olefin include ethylene, propylene, 1-butene, isobutylene, 2-butene, cyclobutene, 1-pentene, 1-hexene, 4-methyl-1-pentene, 1-octene, 3-methyl-1-butene, 4-methyl-1-butene, cyclopentene, 1-hexene, cyclohexene, 1-octene, 1-decene, 1-dodecene, etc. These may be used singly or in combinations of two or more kinds thereof. In certain preferred embodiments, the polyolefin elastomers are those that comprise at least 50 wt % of ethylene, or propylene, or butene-derived units.

The polyolefin elastomer may be a random copolymer (the comonomer-derived units are randomly distributed along the polymer backbone), a block copolymer (the comonomer-derived units occur along long sequences), or any variation thereof. The presence of randomness or triad tacticity in a copolymer can be determined by $^{13}C$ NMR as is known in the art and described in, for example, 18 J. POLY. SCI.: POLY. LETT. ED. pp. 389-394 (1980).

In certain embodiments, the polyolefin elastomer may have a Shore A hardness of from a lower limit of about 10, about 20, about 30, about 40, about 50, or about 60 to an upper limit of about 70, about 75, about 80, about 85, about 90, or about 95, as determined by ASTM D2240.

In one or more preferred embodiments, the polyolefin elastomer may have an a melt flow rate (MFR), as determined by ASTM D1238, 2.16 kg at 230° C., of greater than about 0.1 g/10 min, about 0.5 g/10 min, about 1 g/10 min, about 2 g/10 min, about 5 g/10 min, or about 10 g/10 min, and preferably up to about 20 g/10 min, about 40 g/10 min, about 80 g/10 min, about 100 g/10 min, or about 200 g/10 min.

In certain embodiments, the polyolefin elastomer of the present invention has an elongation at break, as determined by ASTM D412, of at least about 100%, at least about 200%, at least about 300%, and may be up to about 800%, about 1000% or about 2000%, and preferably in the range of from about 100% to about 2000%.

In certain embodiments, the polyolefin elastomer of the present invention has a density, as determined by ASTM D1505, of from about 0.83 g/cm$^3$ to about 0.9 g/cm$^3$, preferably from about 0.85 g/cm$^3$ to about 0.89 g/cm$^3$, from about 0.86 g/cm$^3$ to about 0.88 g/cm$^3$, or from about 0.86 g/cm$^3$ to about 0.87 g/cm$^3$.

In certain embodiments, the polyolefin elastomer of the present invention has a flexural modulus at 1% Secant (73° F.) (23° C.), as determined by ASTM D790, of from about 8 MPa to about 100 MPa.

In certain embodiments, the polyolefin elastomer used with the present invention is present in an amount of less than about 150 phr, preferably less than about 100 phr, more preferably less than about 50 phr, most preferably less than about 20 phr. In embodiments of the invention, the polyolefin elastomer is present in an amount greater than 0 phr and less than about 20 phr, for example, about 1 phr, about 2 phr, about 3 phr, about 4 phr, about 5 phr, about 6 phr, about 7 phr, about 8 phr, about 9 phr, about 10 phr, about 11 phr, about 12 phr, about 13 phr, about 14 phr, about 15 phr, about 16 phr, about 17 phr, about 18 phr, about 19 phr, relative to the EPDM.

In a preferred embodiment, the polyolefin elastomer of the present invention is a propylene-based elastomer comprising at least about 60 wt % propylene-derived units and about 5 to about 25 wt % ethylene-derived units, based on total weight of the propylene-based elastomer, wherein the propylene-based elastomer has a heat of fusion of less than about 80 J/g. The propylene-based elastomer is a copolymer of propylene-derived units and units derived from at least one of ethylene or a $C_{4-10}$ alpha-olefin. The propylene-based elastomer has limited crystallinity due to adjacent isotactic propylene units and a melting point as described herein. The crystallinity and the melting point of the propylene-based elastomer are reduced compared to highly isotactic polypropylene by the introduction of errors in the insertion of propylene. The propylene-based elastomer is generally devoid of any substantial intermolecular heterogeneity in tacticity and comonomer composition, and also generally devoid of any substantial heterogeneity in intramolecular composition distribution.

The units, or comonomers, derived from at least one of ethylene or a $C_{4-10}$ alpha-olefin may be present in the propylene-based elastomer in an amount of about 1 to about 35 wt %, or about 5 to about 35 wt %, preferably about 7 to about 32 wt %, more preferably about 8 to about 25 wt %, even more preferably about 8 to about 20 wt %, and most preferably about 8 to about 18 wt % of the propylene-based elastomer. The comonomer content may be adjusted so that the propylene-based elastomer has a heat of fusion of less than about 80 J/g, a melting point of about 105° C. or less, and a crystallinity of about 2% to about 65% of isotactic polypropylene, and a MFR of about 2 to about 20 g/10 min.

The propylene-based elastomer may comprise more than one comonomer. Preferred embodiments of a propylene-based elastomer having more than one comonomer include propylene-ethylene-octene, propylene-ethylene-hexene, and propylene-ethylene-butene polymers. In some embodiments where more than one comonomer derived from at least one of ethylene or a $C_{4-10}$ alpha-olefin is present, the amount of one comonomer may be less than about 5 wt % of the propylene-based elastomer, but the combined amount of comonomers of the propylene-based elastomer is about 5 wt % or greater.

In a preferred embodiment, the comonomer is ethylene, 1-hexene, or 1-octene. In one embodiment, the propylene-based elastomer comprises ethylene-derived units. The propylene-based elastomer may comprise about 5 to about 25 wt %, preferably about 8 to about 20 wt %, or about 9 to about 16 wt % ethylene-derived units of the propylene-based elastomer. In some embodiments, the propylene-based elastomer consists essentially of units derived from propylene and ethylene, i.e., the propylene-based elastomer does not contain any other comonomer in an amount typically present as impurities in the ethylene and/or propylene feedstreams used during polymerization or an amount that would materially affect the heat of fusion, melting point, crystallinity, or MFR of the propylene-based elastomer, or any other comonomer intentionally added to the polymerization process.

The propylene-based elastomer may have a triad tacticity of three propylene units, as measured by $^{13}C$ NMR, of at least about 75%, at least about 80%, at least about 82%, at least about 85%, or at least about 90%. Preferably, the propylene-based elastomer has a triad tacticity of about 50 to about 99%, about 60 to about 99%, more preferably about 75 to about 99%, or about 80 to about 99%. In some embodiments, the propylene-based elastomer may have a triad tacticity of about 60 to 97%.

The propylene-based elastomer has a heat of fusion ("$H_f$"), as determined by DSC, of about 80 J/g or less, preferably about 70 J/g or less, about 50 J/g or less, or about 35 J/g or less. The propylene-based elastomer may have a lower limit $H_f$ of about 0.5 J/g, about 1 J/g, or about 5 J/g. For example, the $H_f$ value may be anywhere from 1.0, 1.5, 3.0, 4.0, 6.0, or 7.0 J/g, to 30, 35, 40, 50, 60, 70, 75, or 80 J/g.

The propylene-based elastomer may have a percent crystallinity, as determined according to the DSC procedure described herein, of about 2 to about 65%, preferably about 0.5 to about 40%, preferably about 1 to about 30%, and more preferably about 5 to about 35%, of isotactic polypropylene. The thermal energy for the highest order of propylene (i.e., 100% crystallinity) is estimated at 189 J/g. In some embodiments, the copolymer has crystallinity less than 40%, in the range of about 0.25 to about 25%, or about 0.5 to about 22% of isotactic polypropylene. Embodiments of the propylene-based elastomer may have a tacticity index m/r from a lower limit of about 4 or about 6 to an upper limit of about 8 or about 10 or about 12. In some embodiments, the propylene-based elastomer has an isotacticity index greater than 0%, or within the range having an upper limit of about 50% or about 25%, and a lower limit of about 3% or about 10%.

In some embodiments, crystallinity of the propylene-based elastomer is reduced by copolymerization of propylene with limited amounts of one or more comonomers selected from: ethylene, $C_{4-20}$ alpha-olefins, and polyenes. In these copolymers, the amount of propylene-derived units present in the propylene-based elastomer ranges from an upper limit of about 95 wt %, about 94 wt %, about 92 wt %, about 90 wt %, or about 85 wt %, to a lower limit of about 60 wt %, about 65 wt %, about 70 wt %, about 75 wt %, about 80 wt %, about 84 wt %, or about 85 wt % of the propylene-based elastomer.

The optional polyene may be any hydrocarbon structure having at least two unsaturated bonds wherein at least one of the unsaturated bonds is readily incorporated into a polymer. For example, the optional polyene may be selected from straight chain acyclic olefins, such as 1,4-hexadiene and 1,6-octadiene; branched chain acyclic olefins, such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins, such as tetrahydroindene, norbornadiene, methyl-tetrahydroindene, dicyclopentadiene, bicyclo-(2.2.1)-hepta-2,5-diene, norbornadiene, alkenyl norbornenes, alkylidene norbornenes, e.g., ethylidiene norbornene ("ENB"), cycloalkenyl norbornenes, and cycloalkyliene norbornenes (such as 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene); and cycloalkenyl-substituted alkenes, such as vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene. The amount of optional polyene-derived units present in the propylene-based elastomer ranges from an upper limit of about 15%, about 10%, about 7%, about 5%, about 4.5%, about 3%, about 2.5%, or about 1.5%, to a lower limit of about 0%, about 0.1%, about 0.2%, about 0.3%, about 0.5%, or about 1%, based on the total weight of the propylene-based elastomer. In a preferred embodiment, the propylene-based elastomer does not contain any diene-derived units (as used herein, "diene").

The propylene-based elastomer may have a single peak melting transition as determined by DSC. In one embodiment, the copolymer has a primary peak transition of about 90° C. or less, with a broad end-of-melt transition of about 110° C. or greater. The peak "melting point" ("$T_m$") is defined as the temperature of the greatest heat absorption within the range of melting of the sample. However, the copolymer may show secondary melting peaks adjacent to the principal peak, and/or at the end-of-melt transition. For the purposes of this disclosure, such secondary melting peaks are considered together as a single melting point, with the highest of these peaks being considered the $T_m$ of the propylene-based elastomer. The propylene-based elastomer may have a $T_m$ of about 110° C. or less, about 105° C. or less, about 100° C. or less, about 90° C. or less, about 80° C. or less, or about 70° C. or less. In one embodiment, the propylene-based elastomer has a $T_m$ of about 25° C. to about 105° C., preferably about 60° C. to about 105° C., about 70° C. to about 105° C., or about 90° C. to about 105° C.

The propylene-based elastomer may have a density of about 0.850 to about 0.900 g/cm³, preferably about 0.860 to about 0.880 g/cm³, at room temperature as measured per ASTM D1505.

The propylene-based elastomer may have a MFR, as measured per ASTM D1238, 2.16 kg at 230° C., of at least about 2 g/10 min. In one embodiment, the propylene-based elastomer has a MFR about 2 to about 20 g/10 min, about 2 to about 10 g/10 min, or about 2 to about 5 g/10 min.

The propylene-based elastomer may have an Elongation at Break of less than about 2000%, less than about 1000%, or less than about 800%, as measured per ASTM D412.

The propylene-based elastomer may have a weight average molecular weight ($M_w$) of about 5,000 to about 5,000,000 g/mole, preferably about 10,000 to about 1,000,000 g/mole, and more preferably about 50,000 to about 400,000 g/mole; a number average molecular weight ($M_n$) of about 2,500 to about 250,000 g/mole, preferably about 10,000 to about 250,000 g/mole, and more preferably about 25,000 to about 250,000 g/mole; and/or a z-average molecular weight ($M_z$) of about 10,000 to about 7,000,000 g/mole, preferably about 80,000 to about 700,000 g/mole, and more preferably about 100,000 to about 500,000 g/mole. The propylene-based elastomer may have a molecular weight distribution ("MWD") of about 1.5 to about 20, or about 1.5 to about 15, preferably about 1.5 to about 5, and more preferably about 1.8 to about 3, and most preferably about 1.8 to about 2.5.

Preferred propylene-based elastomers are available commercially under the trade names VISTAMAXX™ (ExxonMobil Chemical Company, Houston, Tex., USA), VERSIFY™ (The Dow Chemical Company, Midland, Mich., USA), certain grades of TAFMER™ XM or NOTIO™ (Mitsui Company, Japan), and certain grades of SOFTEL™ (Basell Polyolefins of the Netherlands). The particular grade(s) of commercially available propylene-based elastomer suitable for use in the invention can be readily determined using methods commonly known in the art.

The composition of the invention, e.g., a masterbatch, may include one or more different propylene-based elastomers, i.e., propylene-based elastomers each having one or more different properties such as, for example, different comonomer or comonomer content. Such combinations of various propylene-based elastomers are all within the scope of the invention.

In certain embodiments, the propylene-based elastomer is an elastomer including propylene-crystallinity, a melting point by DSC equal to or less than 105° C., and a heat of fusion of from about 5 J/g to about 30 J/g. The propylene-derived units are present in an amount of about 80 to about 90 wt %, based on the total weight of the propylene-based elastomer. The ethylene-derived units are present in an amount of about 9 to about 18 wt %, for example, about 9, about 9.5, about 10, about 10.5, about 11, about 11.5, about 12, about 12.5, about 13, about 13.5, about 14, about 14.5, about 15, about 15.5, about 16, about 16.5, about 17, about 17.5, about 18 wt %, based on the total weight of the propylene-based elastomer.

The propylene-based elastomer may comprise copolymers prepared according to the procedures described in WO 02/36651, U.S. Pat. No. 6,992,158, and/or WO 00/01745, the contents of which are incorporated herein by reference. Preferred methods for producing the propylene-based elastomer may be found in U.S. Pat. Nos. 7,232,871 and 6,881,800, the contents of which are incorporated herein by reference. The invention is not limited by any particular polymerization method for preparing the propylene-based elastomer, and the polymerization processes are not limited by any particular type of reaction vessel.

Exemplary polyolefin elastomers useful in this invention include ethylene-based elastomers having one or more of the following properties:

(1) an ethylene content of about 60 wt % to about 90 wt %, preferably about 65 wt % to about 85 wt %, preferably about 65 wt % to about 80 wt %, preferably about 65 wt % to about 75 wt %;

(2) an ethylene content of about 80 mol % to about 96 mol %, preferably about 82 mol % to about 92 mol %, preferably about 82 mol % to about 88 mol %, preferably about 84 mol % to about 86 mol %;

(3) a propylene content of about 10 wt % to about 20 wt %;

(4) a 1-butene content of about 15 wt % or more, preferably about 20 wt % or more, preferably about 25 wt % or more;

(5) a 1-hexene content of about 20 wt % or more, preferably about 25 wt % or more, preferably about 30 wt % or more;

(6) a 1-octene content of about 25 wt % or more, preferably about 30 wt % or more, preferably about 35 wt % or more;

(7) a density of about 0.9 g/cm$^3$ or less, preferably 0.89 g/cm$^3$ or less, preferably 0.88 g/cm$^3$ or less, preferably 0.87 g/cm$^3$ or less, preferably 0.86 g/cm$^3$ or less, preferably 0.83 g/cm$^3$ or more, preferably 0.84 g/cm$^3$ or more, preferably 0.85 g/cm$^3$ or more, preferably 0.855 g/cm$^3$ or more, preferably about 0.83 g/cm$^3$ to about 0.9 g/cm$^3$, preferably from about 0.85 g/cm$^3$ to about 0.89 g/cm$^3$, preferably from about 0.85 g/cm$^3$ to about 0.88 g/cm$^3$, or preferably from about 0.85 g/cm$^3$ to about 0.87 g/cm$^3$;

(8) a heat of fusion ($H_f$) of about 90 J/g or less, preferably about 70 J/g or less, preferably about 50 J/g or less, preferably about 30 J/g or less, preferably about 10 J/g to 70 J/g, preferably about 10 J/g to about 50 J/g, preferably about 10 J/g to about 30 J/g;

(9) a crystallinity of about 40% or less, preferably about 30% or less, preferably about 20% or less, and at least about 5%, preferably about 5% to about 30%, preferably about 5% to about 20%;

(10) a melting point ($T_m$, peak first melt) of about 100° C. or less, preferably about 90° C. or less, preferably about 80° C. or less, preferably about 70° C. or less, preferably about 60° C. or less, preferably about 50° C. or less;

(11) a crystallization temperature ($T_c$, peak) of about 90° C. or less, preferably about 80° C. or less, preferably about 70° C. or less, preferably about 60° C. or less, preferably about 50° C. or less, preferably about 40° C. or less;

(12) a glass transition temperature ($T_g$) of about −20° C. or less, preferably about −30° C. or less, preferably about −40° C. or less;

(13) a $M_w$ of about 30,000 g/mol to about 2,000,000 g/mol, preferably about 50,000 g/mol to about 1,000,000 g/mol, preferably about 90,000 g/mol to about 500,000 g/mol;

(14) a $M_w/M_n$ of about 1 to about 40, preferably about 1.4 to about 20, preferably about 1.6 to about 10, preferably about 1.8 to about 3.5, preferably about 1.8 to about 2.5;

(15) a branching index (g') of about 0.9 or greater, preferably about 0.95 or greater, preferably about 0.99 or greater; and

(16) a melt index (MI) of about 0.1 g/10 min to about 100 g/10 min, preferably about 0.3 g/10 min to about 60 g/10 min, preferably about 0.5 g/10 min to about 40 g/10 min, preferably about 0.7 g/10 min to about 20 g/10 min.

In certain preferred embodiments, the ethylene-based elastomer comprises at least 30 wt % of one or more $C_{4-20}$ olefin comonomers, for example, 1-butene, 1-hexene, and/or 1-octene. In some embodiments, the ethylene-based elastomer can be a random copolymer, a statistical copolymer, a block copolymer, or blends thereof. The invention is not limited by any particular polymerization method for preparing the ethylene-based elastomer. In certain preferred embodiments, the ethylene-based elastomer is produced using a metallocene catalyst system.

Ethylene-based elastomer useful in the present invention include those commercially available under the trade names EXACT™ (ExxonMobil Chemical Company, Houston, Tex., USA), ENGAGE™ and INFUSE™ (The Dow Chemical Company, Midland, Mich., USA), and certain grades of TAFMER™ (Mitsui Company, Japan).

Fillers

The composition of the present invention can optionally include one or more fillers such as calcium carbonate, clay, mica, silica and silicates, talc, titanium dioxide, starch, and other fillers such as wood flour, and carbon black. The filler components can be present at a level of from 150 to 350 phr of the EPDM, such as from 180 to 320 phr. In some embodiments, two or more types of carbon black are used in combination, for example, Regal 85 is a carbon black that has multiple particle sizes. Combinations also include those where the carbon black differ based on surface areas. Likewise, different types of carbon black which have been treated differently can also be used. For example, a carbon black that has been chemically treated can be combined with a carbon black that has not been chemically treated. The carbon black can typically be present at a level of from 120 to 280 phr, preferably 150 to 250 phr of the EPDM.

In one or more embodiments, the composition of the present invention can include one or more exfoliated clays. Exfoliated clays, also referred to as "nanoclays," are well known, and their identity, methods of preparation and blending with polymers is disclosed in, for example, JP 2000-109635, 2000-109605, 11310643; DE 19726278; WO 98/53000; U.S. Pat. Nos. 5,091,462, 4,431,755, 4,472,538, and 5,910,523. Swellable layered clay materials can include natural or synthetic phyllosilicates, particularly smectic clays such as montmorillonite, nontronite, beidellite, volkonskoite, laponite, hectorite, saponite, sauconite, magadiite, kenyaite, stevensite and the like, as well as vermiculite, halloysite, aluminate oxides, hydrotalcite, and the like. These layered clays generally comprise particles containing a plurality of silicate platelets having a thickness of from 4-20 Å or 8-12 Å, bound together and contain exchangeable cations such as $Na^+$, $Ca^{+2}$, $K^+$, or $Mg^{+2}$ present at the interlayer surfaces.

The layered clay can be intercalated and exfoliated by treatment with organic molecules (swelling agents) capable of undergoing ion exchange reactions with the cations present at the interlayer surfaces of the layered silicate. Suitable swelling agents include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides. Desirable amine compounds (or the corresponding ammonium ion) are those with the structure $R_1R_2R_3N$, wherein $R_1$, $R_2$, and $R_3$ are $C_1$ to $C_{20}$ alkyls or alkenes which can be the same or different. In one or more embodiments, the exfoliating agent is a so called long chain tertiary amine, wherein at least $R_1$ is a $C_{14}$ to $C_{20}$ alkyl or alkene.

Another class of swelling agents includes those which can be covalently bonded to the interlayer surfaces. These include polysilanes of the structure $—Si(R')_2R^2$ where R' is the same or different at each occurrence and is selected from alkyl, alkoxy or oxysilane and $R^2$ is an organic radical compatible with the matrix polymer of the composite.

Other suitable swelling agents include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734, 4,889,885, as well as WO 92/02582.

Clay or exfoliated clay can be incorporated in the compositions in an amount sufficient to develop an improvement in the mechanical properties or barrier properties of the composition, e.g., tensile strength or air/oxygen permeability. Amounts generally will range from 0.5 to 15 wt %; or from 1 to 10 wt %; or from 1 to 5 wt %, based on the polymer content of the composition. Expressed in parts per hundred pounds of rubber, the clay or exfoliated clay can be present from 1 to 30 phr; or from 3 to 20 phr. In one or more embodiments, the exfoliated clay is an alkylamine-exfoliated clay.

Carbon black can be produced by the incomplete combustion of organic substances. There are two main production processes for the manufacture of carbon black: the oil furnace process and the thermal process. In the furnace process a fuel is burned in an excess of air to produce finely divided carbon. There are several distinct production segments: reaction; filtration and separation; pelletizing; and drying. The thermal process is similar, but is a continuous furnace process. The American Society of Testing Materials (ASTM) has established a carbon black classification system based on particle size and surface oxidation, ASTM D1765. The degree of surface oxidation affects the cure time of carbon-black filled rubber compounds. The "N" denotes normal curing blacks and the "S" refers to slow curing blacks. After N or S, the first number of the three-digit suffix identifies the particle size and the remaining two digits are assigned arbitrarily.

Carbon black's reinforcing character in rubber can be attributed to the size, shape and surface chemistry of the aggregate structures which are made of primary particles essentially spherical in shape and chemically bonded to one another. Two important properties of carbon black are surface area and structure. Surface area depends inversely on the size of the primary particles, and is one measure of the area available for physical interaction with the polymer. Surface area ranges from 10-140 $m^2/g$ with thermal blacks having the lowest values based on nitrogen adsorption ($N_2SA$) via ASTM D4820. Surface area is also measured by cetyl trimethylammonium bromide (CTAB) absorption. The structure of carbon black depends on the size and grouping of these primary particles in the aggregate. The more primary particles in the aggregate, the higher structure of the carbon black due to the more complex shape and void volume (porosity). Structure varies from 35-130 $cm^3/100$ gm as measured by dibutylphthalate (DBP) oil absorption via ASTM D2414. Useful grades of carbon black as described in Rubber Technology, pp. 59-85 (1995) range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires are N330, N351, N550, N650, N660, and N762. Embodiments of the carbon black useful in, for example, innerliners or innertubes are N550, N650, N660, N762, N990, and the like.

The compositions can include carbon black having a surface area of less than 35 $m^2/g$ and a dibutylphthalate oil absorption of less than 90 $cm^3/100$ gm. Suitable carbon black can also have a surface area ranging from a low of about 7 $m^2/g$, 10 $m^2/g$, or 15 $m^2/g$ to a high of about 25 $m^2/g$, 30 $m^2/g$ or 35 $m^2/g$. Suitable carbon black can also have a surface area ranging from a low of about 7 $m^2/g$, 10 $m^2/g$, or 23 $m^2/g$ to a high of about 25 $m^2/g$, 26 $m^2/g$, or 28 $m^2/g$. Suitable carbon black can also have a dibutylphthalate oil absorption of at least 25 $cm^3/100$ gm and less than 90 $cm^3/100$ gm, less than 80 $cm^3/100$ gm, less than 70 $cm^3/100$ gm, less than 65 $cm^3/100$ gm, or less than 60 $cm^3/100$ gm. The dibutylphthalate oil absorption of the carbon black can also range from a low of about 30 $cm^3/100$ gm, 35 $cm^3/100$ gm, or 40 $cm^3/100$ gm to a high of about 60 $cm^3/100$ gm, 70 $cm^3/100$ gm, or 80 $cm^3/100$ gm. Suitable carbon blacks can include, but are not limited to N550, N762, N774, N907, N990, Regal 85, and Regal 90.

Processing Aids

The composition of the present invention can optionally include one or more processing aids. Suitable processing aids can include, but are not limited to, plasticizers, tackifiers, extenders, chemical conditioners, homogenizing agents and peptizers such as mercaptans, petroleum and vulcanized vegetable oils, mineral oils, paraffin oils, polybutene oils, naphthenic oils, aromatic oils, waxes, resins, rosins, or other synthetic fluids having a lower pour point, lower emission, etc., compared to paraffin or mineral oil and the like. Some commercial examples of processing aids are SUNDEX™ (Sun Chemicals) and FLEXON™ (ExxonMobil Chemical Company).

Preferred plasticizers include polyalphaolefins (PAOs), high purity hydrocarbon fluid compositions (HPFCs) and Group III basestocks such as those described in WO 2004/014998. Preferred PAOs include oligomers of decene and co-oligomers of decene and dodecene. Preferred PAOs are available under the trade name SuperSyn™, SpectraSyn™ PAO, and ELEVAST™ from ExxonMobil Chemical Company.

Suitable polybutene oils have an $M_n$ of less than 15,000 g/mol. Preferred polybutene oils also include homopolymer or copolymer of olefin derived units having from 3 to 8 carbon atoms, preferably from 4 to 6 carbon atoms. In yet another embodiment, the polybutene is a homopolymer or copolymer of a $C_4$ raffinate. An embodiment of preferred low molecular weight polymers termed "polybutene" polymers is described in, for example, Synthetic Lubricants and High-Performance Functional Fluids, pp. 357-392 (Leslie R. Rudnick & Ronald L. Shubkin, ed., Marcel Dekker 1999) (hereinafter "polybutene processing oil" or "polybutene").

In one or more embodiments, the polybutene oil can be a copolymer comprising at least isobutylene derived units, and optionally 1-butene derived units, and/or 2-butene derived units. In one or more embodiments, the polybutene is a homopolymer of isobutylene, or a copolymer of isobutylene and 1-butene or 2-butene, or a terpolymer of isobutylene and 1-butene and 2-butene, wherein the isobutylene derived units are from 40 to 100 wt % of the copolymer, the 1-butene derived units are from 0 to 40 wt % of the copolymer, and the 2-butene derived units are from 0 to 40 wt % of the copolymer. In one or more embodiments, the polybutene is a copolymer or terpolymer wherein the isobutylene derived units are from 40 to 99 wt % of the copolymer, the 1-butene derived units are from 2 to 40 wt % of the copolymer, and the 2-butene derived units are from 0 to 30 wt % of the copolymer. In yet another embodiment, the polybutene is a terpolymer of the three units, wherein the isobutylene derived units are from 40 to 96 wt % of the copolymer, the 1-butene derived units are from 2 to 40 wt % of the copolymer, and the 2-butene derived units are from 2 to 20 wt % of the copolymer. In yet another embodiment, the polybutene is a homopolymer or copolymer of isobutylene and 1-butene, wherein the isobutylene derived units are from 65 to 100 wt % of the homopolymer or copolymer, and the 1-butene derived units are from 0 to 35 wt % of the copolymer.

Polybutene processing oils typically have a number average molecular weight ($M_n$) of less than 10,000 g/mol, less than 8,000 g/mol, or less than 6,000 g/mol. In one or more embodiments, the polybutene oil has a number average molecular weight of greater than 400 g/mol, and greater than 700 g/mol, or greater than 900 g/mol. A preferred embodiment can be a combination of any lower limit with any upper limit herein. For example, in one or more embodiments of the polybutene described, the polybutene has a number average molecular weight of from 400 g/mol to 10,000 g/mol, and from 700 g/mol to 8,000 g/mol. Useful viscosities of the polybutene processing oil ranges from 10 to 6,000 cSt (centistokes) at 100° C., or from 35 to 5,000 cSt at 100° C., or is greater than 35 cSt at 100° C., or is greater than 100 cSt at 100° C.

The composition of the present invention can include one or more types of polybutene as a mixture, blended either prior to addition to the elastomer, or with the elastomer. The amount and identity (e.g., viscosity, $M_n$, etc.) of the polybutene processing oil mixture can also be varied to achieve some other viscosity or molecular weight. In this manner, the physical properties of the composition can be controlled. More particularly, the phrases "polybutene processing oil", or "polybutene processing oils" include a single oil or a composition of two or more oils used to obtain any viscosity or molecular weight (or other property) desired, as specified in the ranges disclosed herein.

The processing oil or oils can be present in the composition described from 60 to 170 phr of the EPDM in one embodiment, from 70 to 160 phr in another embodiment, and from 85 to 145 phr in yet another embodiment.

Curing Agents and Accelerators

The composition of the present invention can optionally include one or more other components and additives customarily used in elastomer blends, such as pigments, accelerators, cross-linking and curing materials, antioxidants, antiozonants, etc.

Cross-linking and curing agents include sulfur, zinc oxide, and fatty acids. Generally, polymer compositions can be crosslinked by adding curative molecules, for example sulfur, metal oxides (i.e., zinc oxide), organometallic compounds, radical initiators, etc., followed by heating. In particular, the following are common curatives that will function in the present invention: $ZnO$, $CaO$, $MgO$, $Al_2O_3$, $CrO_3$, $FeO$, $Fe_2O_3$, and $NiO$. These metal oxides can be used in conjunction with the corresponding metal stearate complex (e.g., $Zn(Stearate)_2$, $Ca(Stearate)_2$, $Mg(Stearate)_2$, and $Al(Stearate)_3$), or with stearic acid, and a sulfur compound. The method often used for the vulcanization of natural rubber blends can also be applied to the composition of the present invention.

Accelerators include amines, guanidines, thioureas, thiazoles, thiurams, sulfenamides, sulfenimides, thiocarbamates, xanthates, and the like. Acceleration of the cure process can be accomplished by adding to the composition an amount of the accelerator. The mechanism for accelerated vulcanization of the compositions comprising EPDM involves complex interactions between the curative, accelerator, activators and polymers. Ideally, the entire available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), dipentamethylenethiuram tetrasulfide (DPTT), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio)benzothiazole (MBS or MOR), compositions of 90% MOR and 10% MBTS (MOR 90), N-tertiarybutyl-2-benzothiazole sulfenamide (TBBS), and N-oxydiethylene thiocarbamyl-N-oxydiethylene sulfonamide (OTOS), zinc 2-ethyl hexanoate (ZEH), N,N'-diethyl thiourea.

A cure system includes those components described above that facilitate or influence the cure of elastomers, such as metals, accelerators, sulfur, and other agents common in the art, and as described above. In one or more embodiments described, a sulfur cure system comprising sulfur and a sulfur donor is used with the composition of the present invention, in which sulfur is present in an amount less than 5 phr, preferably less than 61 phr relative to the EPDM, and at least one sulfur donor is present in an amount less than 5 phr relative to the EPDM. In a preferred embodiment, the sulfur donor comprises at least one of TMTD and DPTT.

Properties

One purpose of the present invention is to improve rheological properties only with a very limited loss of other properties, such as tensile strength at break and compression set, which would be advantageous in applications such as extrusion articles.

In one embodiment, the composition of the present invention, in which the polyolefin elastomer is present in an amount of less than about 150 preferably less than about 100 phr, more preferably less than about 50 phr, most preferably less than about 20 phr, for example, about 19 phr, about 18 phr, about 17 phr, about 16 phr, about 15 phr, about 14 phr, about 13 phr, about 12 phr, about 11 phr, about 10 phr, about 9 phr, about 8 phr, about 7 phr, about 6 phr, about 5 phr, about 4 phr, about 3 phr, about 2 phr, about 1 phr, relative to the EPDM, has a Mooney viscosity [ML(1+4) 100° C.] about 0 to about 15, about 0 to about 10, or about 0 to about 5, lower than the Mooney viscosity [ML(1+4) 100° C.] of a composition free of the polyolefin elastomer but is otherwise identical in terms of its constituents. As used herein, a composition "free of the polyolefin elastomer but is otherwise identical in terms of its constituents" means that the referenced composition has the same constituents in the same ratios (phr) as the inventive composition, except that the polyolefin elastomer in the inventive composition is replaced by EPDM in the referenced composition (see, e.g., Control 1 vs. Samples 1-3 and 1a-3a). Preferably, the polyolefin elastomer is a propylene-based elastomer containing at least about 60 wt % propylene-derived units and about 5 to about 25 wt % ethylene-derived units, based on total weight of the propylene-based elastomer, wherein the propylene-based elastomer has a heat of fusion of less than about 80 J/g. Mooney viscosity, as used herein, can be measured as ML(1+4)@100° C. according to ASTM D1646, unless otherwise specified.

In another embodiment, the composition described herein has a tensile strength at break of at most about 15%, preferably at most about 10%, more preferably at most about 5%, lower than the tensile strength at break of a composition free of the polyolefin elastomer but is otherwise identical in terms of its constituents, as measured by ISO 37 at 23° C.

In yet another embodiment, the composition described herein has a compression set at 25% deflection at most about 30%, preferably at most about 20%, more preferably at most about 10%, higher than the compression set of a composition free of the polyolefin elastomer but is otherwise identical in terms of its constituents, as measured at different temperatures and time points by ISO 815A.

Methods for Making the Composition

Also provided are methods for making compositions of the invention. In one embodiment, the invention encompasses a method for preparing a composition comprising the steps of: (a) combining (i) an EPDM having a Mooney viscosity [ML(1+4) 125° C.] of about 25 to about 300 and an ethylene content of at least about 60 wt % of the EPDM with (ii) a polyolefin elastomer, and (b) forming the composition. In a preferred embodiment, the polyolefin elastomer is a propylene-based elastomer containing at least about 60 wt % propylene-derived units and about 5 to about 25 wt % ethylene-derived units, based on total weight of the propylene-based elastomer, wherein the propylene-based elastomer has a heat of fusion of less than about 80 J/g. Preferably, the composition has a Mooney viscosity [ML(1+4) 100° C.] about 0 to about 15 lower than the Mooney viscosity [ML(1+4) 100° C.] of a composition free of the polyolefin elastomer but is otherwise identical in terms of its constituents.

The components of the composition of the present invention can be mixed by combining them in any suitable mixing device such as a Banbury™ mixer, Brabender™ mixer, or preferably a mixer/extruder or an open mill. Mixing can be performed at temperatures well above the melting point of the elastomer and/or rubber used in the composition at a rate sufficient to allow the graphite and/or clay to exfoliate and become uniformly dispersed within the polymer to form the composition.

Suitable mixing rates can range from about 10 RPM to about 100 RPM. In one or more embodiments, the mixing rate can be about 10 RPM, about 15 RPM, about 20 RPM, about 25 RPM, about 30 RPM, about 35 RPM, about 40 RPM, about 45 RPM, about 50 RPM, about 55 RPM, about 60 RPM, about 65 RPM, about 70 RPM, about 75 RPM, about 80 RPM, about 85 RPM, about 90 RPM, about 95 RMP, and about 100 RPM.

In one or more embodiments, the mixing temperature can range from about 40° C. to about 340° C. In one or more embodiments, the mixing temperature can range from about 80° C. to 300° C. In one or more embodiments, the mixing temperature can range from a low of about 30° C., 40° C., or 50° C. to a high of about 70° C., 170° C., or 340° C. In one or more embodiments, the mixing temperature can range from a low of about 80° C., 90° C., or 100° C. to a high of about 120° C., 250° C., or 340° C. In one or more embodiments, the mixing temperature can range from a low of about 85° C., 100° C., or 115° C. to a high of about 270° C., 300° C., or 340° C.

In at least one specific embodiment, 70% to 100% of the one or more elastomers can be mixed at a rate noted above for 20 to 90 seconds, or until the temperature reaches from 40° C. to 60° C. Then, more than about ½ of the carbon black, and the remaining amount of elastomer, if any, can be added to the mixer, and mixing can continue until the temperature reaches from 90° C. to 150° C. Next, the remaining carbon black and other fillers can be added, as well as processing oil, and mixing can continue until the temperature reaches from 140° C. to 190° C. The finished mixture can then be finished by sheeting on an open mill and allowed to cool to from 60° C. to 100° C. when the curatives are added.

Applications

The present invention encompasses an article produced using the methods and comprising the compositions of the present invention. Examples of the article include, but are not limited to, an extruded article, such as an auto weather-seal, a non-auto weather-seal, a building profile, etc.; a molded article, such as a seal, a gasket, etc.; a hose, such as air hose, heat hose, garden hose, industry hose, etc.; a roof sheet; a film; or a cable jacket, etc.

The present invention also encompasses a method for reducing the Mooney viscosity of a composition, comprising the steps of: (a) combining (i) an ethylene-propylene-diene terpolymer having a Mooney viscosity [ML(1+4) 125° C.] of about 25 to about 300 and an ethylene content of at least about 60 wt % of the ethylene-propylene-diene terpolymer with (ii) a polyolefin elastomer, and (b) forming the composition, preferably the composition has a Mooney viscosity [ML(1+4) 100° C.] about 0 to about 15 lower than the Mooney viscosity [ML(1+4) 100° C.] of a composition free of the polyolefin elastomer but is otherwise identical in terms of its constituents. In a preferred embodiment, the polyolefin elastomer is a propylene-based elastomer containing at least about 60 wt % propylene-derived units and about 5 to about 25 wt % ethylene-derived units, based on total weight of the propylene-based elastomer, wherein the propylene-based elastomer has a heat of fusion of less than about 80 J/g.

Other embodiments can further include:

1. A composition comprising:
    (a) an ethylene-propylene-diene terpolymer (EPDM) having a Mooney viscosity [ML(1+4) 125° C.] of about 25 to about 300 and an ethylene content of at least about 60 wt % of the EPDM; and
    (b) a polyolefin elastomer.
2. The composition of paragraph 1, wherein the EPDM is present in an amount of about 10 to about 50 wt % of the composition.
3. The composition of paragraphs 1 or 2, wherein the polyolefin elastomer is a propylene-based elastomer comprising at least about 60 wt % propylene-derived units and about 5 to about 25 wt % ethylene-derived units, based on total weight of the propylene-based elastomer, wherein the propylene-based elastomer has a heat of fusion of less than about 80 J/g.
4. The composition of paragraph 3, wherein the propylene-based elastomer has a MFR (ASTM D1238, 2.16 kg, 230° C.) of about 2 g/10 min to about 20 g/10 min.
5. The composition of any of paragraphs 1 to 4, wherein the polyolefin elastomer is present in an amount of less than about 150 phr relative to the EPDM.
6. The composition of any of paragraphs 1 to 5, wherein the polyolefin elastomer is present in an amount of less than about 100 phr relative to the EPDM.
7. The composition of any of paragraphs 1 to 6, wherein the polyolefin elastomer is present in an amount of less than about 50 phr relative to the EPDM.
8. The composition of any of paragraphs 1 to 7, wherein the polyolefin elastomer is present in an amount of less than about 20 phr relative to the EPDM.
9. The composition of any of paragraphs 1 to 8, further comprising at least one of a filler, a processing aid, a curing agent, and an accelerator.
10. The composition of any of paragraphs 1 to 9, further comprising sulfur.
11. The composition of paragraph 10, wherein the sulfur is present in an amount of less than 5 phr relative to the EPDM.
12. The composition of any of paragraphs 1 to 11, further comprising a sulfur donor.
13. The composition of paragraph 12, wherein the sulfur donor comprises at least one of tetramethylthiuram disulfide and dipentamethylenethiuram tetrasulfide.
14. The composition of paragraphs 12 or 13, wherein the sulfur donor is present in an amount of less than 5 phr relative to the EPDM.
15. The composition of any of paragraphs 1 to 14, wherein the composition has a Mooney viscosity [ML(1+4) 100° C.] about 0 to about 15 lower than the Mooney viscosity [ML(1+4) 100° C.] of a composition free of the polyolefin elastomer but is otherwise identical in terms of its constituents.
16. The composition of any of paragraphs 1 to 15, wherein the composition has at least one of the following properties: (i) a tensile strength at break at most about 15% lower than the tensile strength at break of a composition free of the polyolefin elastomer but is otherwise identical in terms of its constituents; and (ii) a compression set at most about 30% higher than the compression set of a composition free of the polyolefin elastomer but is otherwise identical in terms of its constituents.
17. A method for preparing a composition, comprising the steps of:
    combining (i) an EPDM having a Mooney viscosity [ML(1+4) 125° C.] of about 25 to about 300 and an ethylene content of at least about 60 wt % of the EPDM with (ii) a polyolefin elastomer, and
    forming the composition.
18. The method of paragraph 17, wherein the polyolefin elastomer is a propylene-based elastomer comprising at least about 60 wt % propylene-derived units and about 5 to about 25 wt % ethylene-derived units, based on total weight of the propylene-based elastomer, wherein the propylene-based elastomer has a heat of fusion of less than about 80 J/g.
19. The method of paragraphs 17 or 18, further comprising the step of forming the composition into an article.
20. The method of any of paragraphs 17 to 19, wherein the composition has a Mooney viscosity [ML(1+4) 100° C.] about 0 to about 15 lower than the Mooney viscosity [ML(1+4) 100° C.] of a composition free of the polyolefin elastomer but is otherwise identical in terms of its constituents.
21. The method of any of paragraphs 17 to 20, wherein the composition has at least one of the following properties: (i) a tensile strength at break at most about 15% lower than the tensile strength at break of a composition free of the polyolefin elastomer but is otherwise identical in terms of its constituents; and (ii) a compression set at most about 30% higher than the compression set of a composition free of the polyolefin elastomer but is otherwise identical in terms of its constituents.
22. An article comprising the composition of any of paragraphs 1 to 16.
23. The article of paragraph 19, wherein the article is an extruded article, molded article, hose, sheet, film, or jacket.
24. A composition comprising:
    (a) an ethylene-propylene-diene terpolymer in an amount of about 20 to about 25 wt % of the composition having a Mooney viscosity [ML(1+4) 125° C.] of about 60 to about 90 and an ethylene content of about 60 to about 75 wt % of the ethylene-propylene-diene terpolymer;
    (b) a propylene-based elastomer in an amount of about 5 to about 15 phr relative to the ethylene-propylene-diene terpolymer, comprising at least 60 wt % propylene and about 5 to about 25 wt % ethylene, based on total weight of the propylene-based elastomer, wherein the propylene-based elastomer has a heat of fusion of less than about 80 J/g;
    (c) sulfur in an amount of about 0.5 phr relative to the ethylene-propylene-diene terpolymer;
    (d) tetramethylthiuram disulfide in an amount of about 1 phr relative to the ethylene-propylene-diene terpolymer; and
    (e) dipentamethylenethiuram tetrasulfide in an amount of about 1.5 phr relative to the ethylene-propylene-diene terpolymer.
25. A method for reducing the Mooney viscosity of a composition, comprising the steps of:
    combining (i) an ethylene-propylene-diene terpolymer having a Mooney viscosity [ML(1+4) 125° C.] of about 25 to about 300 and an ethylene content of at least about 60 wt % of the ethylene-propylene-diene terpolymer with (ii) a polyolefin elastomer, and forming the composition.

26. The method of paragraph 25, wherein the composition formed has a Mooney viscosity [ML(1+4) 100° C.] about 0 to about 15 lower than the Mooney viscosity [ML(1+4) 100° C.] of a composition free of the polyolefin elastomer but is otherwise identical in terms of its constituents.

27. The method of paragraphs 25 or 26, wherein the polyolefin elastomer is a propylene-based elastomer containing at least about 60 wt % propylene-derived units and about 5 to about 25 wt % ethylene-derived units, based on total weight of the propylene-based elastomer, wherein the propylene-based elastomer has a heat of fusion of less than about 80 J/g.

28. The method of any of paragraphs 25 to 27, wherein the composition has at least one of the following properties: (i) a tensile strength at break at most about 15% lower than the tensile strength at break of a composition free of the polyolefin elastomer but is otherwise identical in terms of its constituents; and (ii) a compression set at most about 30% higher than the compression set of a composition free of the polyolefin elastomer but is otherwise identical in terms of its constituents.

EXAMPLES

The foregoing discussion can be further described with reference to the following non-limiting Examples 1 and 2. Example 1 shows the effects of a polyolefin elastomer (e.g., propylene-based elastomer) comprising ethylene-derived units as a component for the composition of the present invention comprising 25 wt % EPDM by Samples 1-3 and 1a-3a. EPDM is partially replaced by a propylene-based elastomer in Samples 1-3, whereas the amount of EPDM remains the same in Sample 1a-3a. For comparative purposes, a first comparative example ("Control 1") is provided to illustrate the effects of a composition comprising 25 wt % EPDM without a polyolefin elastomer. Example 2 shows the effects of a polyolefin elastomer (e.g., propylene-based elastomer) comprising ethylene-derived units as a component for the composition of the present invention comprising 20 wt % EPDM by Samples 4-6 and 4a-6a. EPDM is partially replaced by a propylene-based elastomer in Samples 4-6, whereas the amount of EPDM remains the same in Sample 4a-6a. For comparative purposes, a second comparative example ("Control 2") is also provided to illustrate the effects of a composition comprising 20 wt % EPDM without a polyolefin elastomer.

Each sample was prepared by batch compounding on a 3.2 L internal mixer with tangential rotors, operated at 50 rpm, except the curative for the compositions were blended on a roll mill. The startup temperature was between 50° C. and 70° C. The masterbatch mixing cycle was conducted as follows in Table 1. As used herein, "dump" was when the batch was discharged from the mixer, and "sweep" was when the ram was raised up while mixing to allow the batch to turn over completely. Sweep helps to incorporate the clay that was hung up on the ram during the addition into the mixer.

TABLE 1

| Masterbatch Mixing Cycle | |
|---|---|
| Time (min) | Sequence of Addition |
| 0 | EPDM + Vistamaxx ™ 6102 |
| 1' | ⅔ carbon black + ZnO |
| 2' | ⅓ carbon + Oil + CaCO₃ + others |

TABLE 1-continued

| Masterbatch Mixing Cycle | |
|---|---|
| Time (min) | Sequence of Addition |
| 3' | Sweep - 1 |
| 5' | Sweep - 2 (if necessary) |
| | Dump at 140° C. |

Table 2 provides typical properties of Vistalon™ 5601 and Vistamaxx™ 6102.

TABLE 2

| Typical Properties of Vistalon ™ 5601 and Vistamaxx ™ 6102 | | |
|---|---|---|
| Properties | Vistalon ™ 5601 | Vistamaxx ™ 6102 |
| Mooney viscosity [ML(1 + 4) 125° C.] | 73 | 21 |
| Ethylene content (%) | 68.5 | 16 |
| Diene content (%) | 5 | 0 |

Example 1

Formulations with components and corresponding amounts used to prepare the first comparative example (no propylene-based elastomer), Samples 1-3 and Samples 1a-3a are listed below in Table 3. Test specimens were compression molded and evaluated using standard testing protocols. Test specimens were cured for 8 min at 180° C. Physical properties such as Mooney viscosity [ML(1+4) 100° C.], Mooney Scorch, cure time, tensile strength at break, tensile strength retention and compression set at 25% deflection were measured and illustrated in FIGS. 1-3.

TABLE 3

| Formulations (phr) for Control 1 and Samples 1-3 & 1a-3a | | | | | | | |
|---|---|---|---|---|---|---|---|
| Compound No. | 1 | 2 | 3 | 1a | 2a | 3a | Control 1 |
| Vistalon ™ 5601 | 85 | 90 | 95 | 100 | 100 | 100 | 100 |
| Vistamaxx ™ 6102 | 15 | 10 | 5 | 15 | 10 | 5 | — |
| Carbon Black N550 | 150 | 150 | 150 | 150 | 150 | 150 | 150 |
| Paraffin Oil-High Viscosity | 85 | 85 | 85 | 85 | 85 | 85 | 85 |
| Ground CaCO₃ coated | 45 | 45 | 45 | 45 | 45 | 45 | 45 |
| ZnO | 8 | 8 | 8 | 8 | 8 | 8 | 8 |
| Stearic Acid | 2 | 2 | 2 | 2 | 2 | 2 | 2 |
| TMDQ | 1.5 | 1.5 | 1.5 | 1.5 | 1.5 | 1.5 | 1.5 |
| PEG4000 | 3 | 3 | 3 | 3 | 3 | 3 | 3 |
| Sulfur | 0.5 | 0.5 | 0.5 | 0.5 | 0.5 | 0.5 | 0.5 |
| MBTS | 1.5 | 1.5 | 1.5 | 1.5 | 1.5 | 1.5 | 1.5 |
| DPTT | 1.5 | 1.5 | 1.5 | 1.5 | 1.5 | 1.5 | 1.5 |
| TMTD | 1 | 1 | 1 | 1 | 1 | 1 | 1 |
| ZDBDC-BUTYL ZIMATE | 1.2 | 1.2 | 1.2 | 1.2 | 1.2 | 1.2 | 1.2 |
| ZnEDC | 1 | 1 | 1 | 1 | 1 | 1 | 1 |
| Total | 401.2 | 401.2 | 401.2 | 416.2 | 411.2 | 406.2 | 401.2 |

Figure 3:
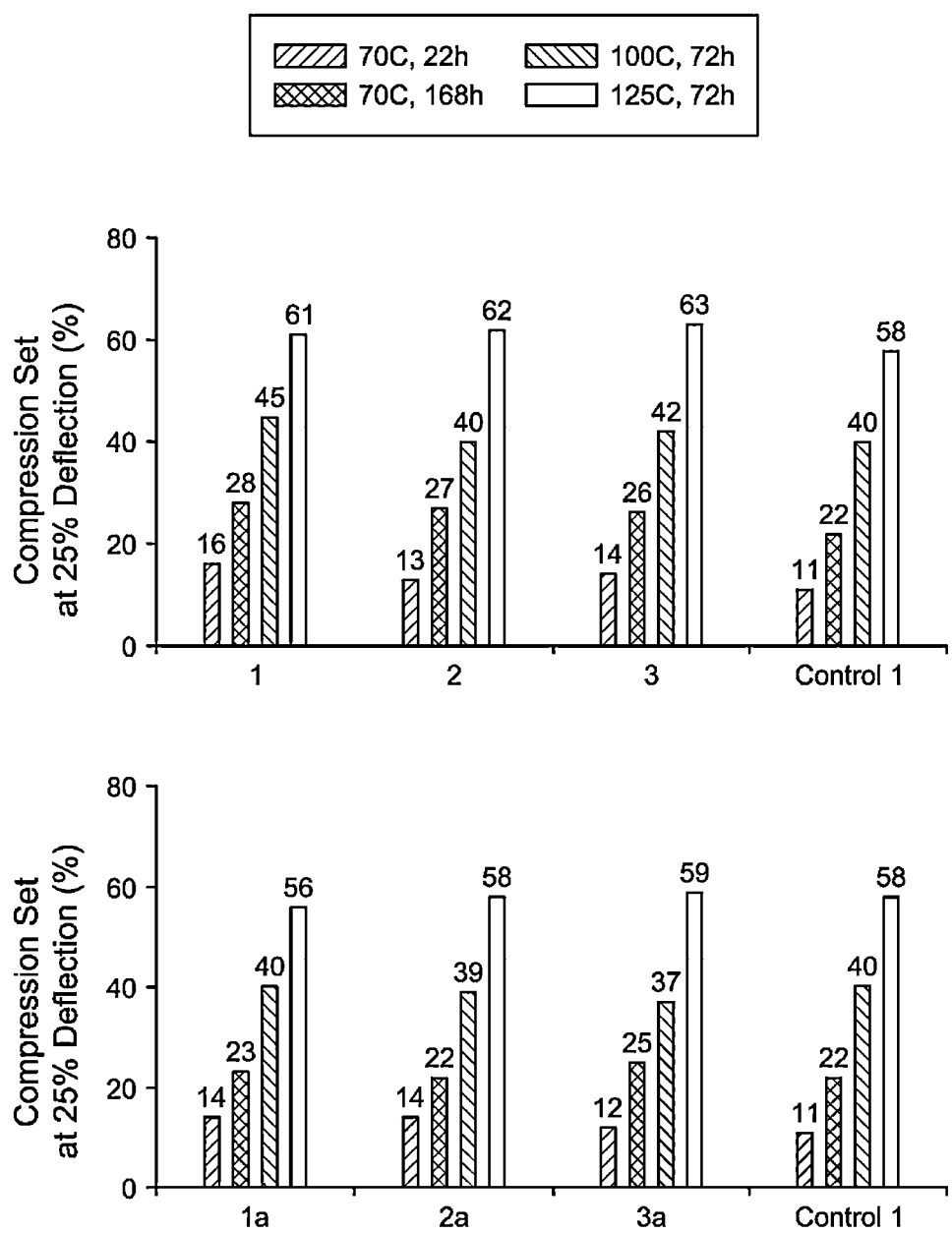
FIG. 3 depicts the compression set at 25% deflection (%) for each of the inventive Samples 1-3 and Samples 1a-3a compared with the first comparative example, at an EPDM amount of 25 wt % of the composition.

FIG. 1 depicts the Mooney viscosity [ML(1+4) 100° C.] (FIG. 1a), Mooney Scorch expressed as time for the Mooney viscosity to rise by 5 units (T5) at 125° C. (FIG. 1b), and cure time for reaching 90% vulcanization curve (T90) at 180° C. (FIG. 1c) for each of Samples 1-3 and Samples 1a-3a compared with the first comparative example. FIG. 2 depicts the tensile strength at break and tensile strength retention after aging for each of Samples 1-3 and Samples 1a-3a compared with the first comparative example. FIG. 3 depicts the compression set at 25% deflection (%) at (70° C., 22 h), (70° C., 168 h), (100° C., 72 h) and (125° C., 72 h) for Samples 1-3 and Samples 1a-3a compared with the first comparative example.

Example 2

Figure 5:
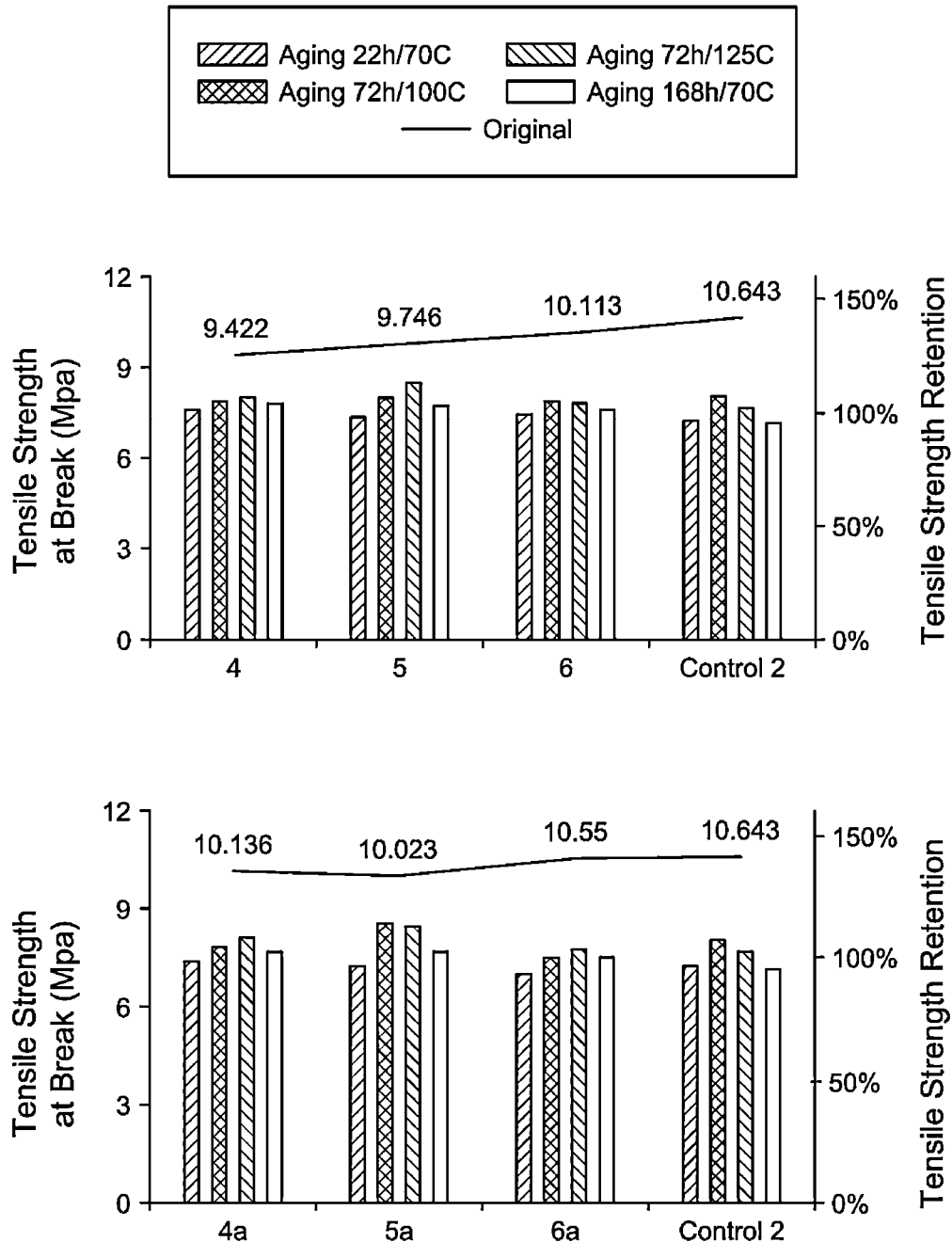
FIG. 5 depicts the tensile strength at break and tensile strength retention after aging for each of the inventive Samples 4-6 and Samples 4a-6a compared with the second comparative example, at an EPDM amount of 20 wt % of the composition.
Figure 6:
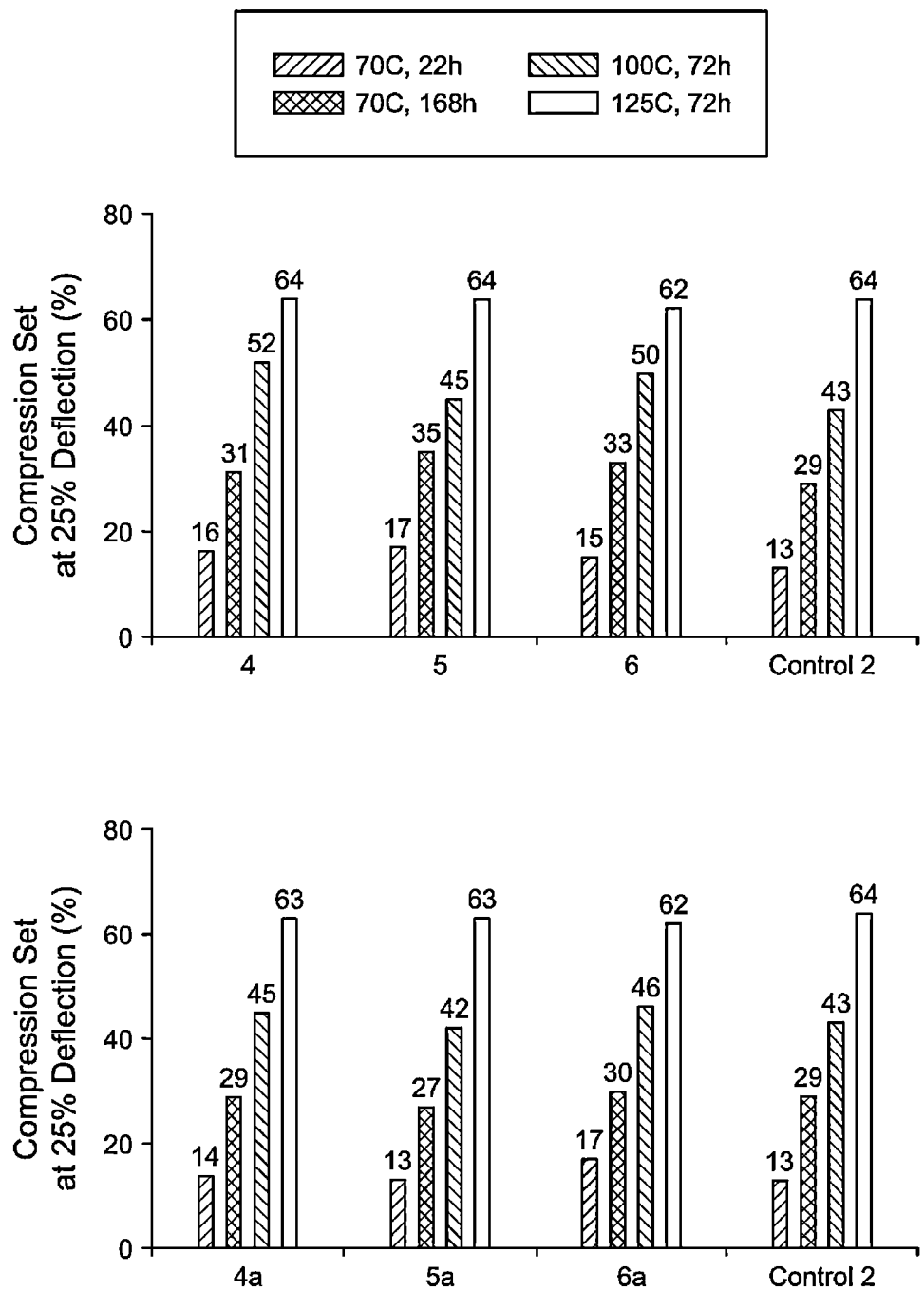
FIG. 6 depicts the compression set at 25% deflection (%) for each of the inventive Samples 4-6 and Samples 4a-6a compared with the second comparative example, at an EPDM amount of 20 wt % of the composition.

Formulations with components and corresponding amounts used to prepare the second comparative example ("Control 2," no polyolefin elastomer), Samples 4-6 and Samples 4a-6a are listed below in Table 4. Test specimens were evaluated using standard testing protocols. Physical properties such as Mooney viscosity [ML(1+4) 100° C.], Mooney Scorch, cure time, tensile strength at break, tensile strength retention and compression set at 25% deflection were measured and illustrated in FIGS. 4-6.

TABLE 4

Formulations (phr) for Control 2 and Samples 4-6 & 4a-6a

| Compound No. | 4 | 5 | 6 | 4a | 5a | 6a | Control 2 |
|---|---|---|---|---|---|---|---|
| Vistalon ™ 5601 | 85 | 90 | 95 | 100 | 100 | 100 | 100 |
| Vistamaxx ™ 6102 | 15 | 10 | 5 | 15 | 10 | 5 | — |
| Carbon Black N550 | 210 | 210 | 210 | 210 | 210 | 210 | 210 |
| Paraffin Oil-High Viscosity | 120 | 120 | 120 | 120 | 120 | 120 | 120 |
| Ground CaCO3 coated | 50 | 50 | 50 | 50 | 50 | 50 | 50 |
| ZnO | 8 | 8 | 8 | 8 | 8 | 8 | 8 |
| Stearic Acid | 2 | 2 | 2 | 2 | 2 | 2 | 2 |
| TMDQ | 1.5 | 1.5 | 1.5 | 1.5 | 1.5 | 1.5 | 1.5 |
| PEG4000 | 2 | 2 | 2 | 2 | 2 | 2 | 2 |
| Sulfur | 0.5 | 0.5 | 0.5 | 0.5 | 0.5 | 0.5 | 0.5 |
| MBTS | 1.5 | 1.5 | 1.5 | 1.5 | 1.5 | 1.5 | 1.5 |
| DPTT | 1.5 | 1.5 | 1.5 | 1.5 | 1.5 | 1.5 | 1.5 |
| TMTD | 1 | 1 | 1 | 1 | 1 | 1 | 1 |
| ZDBDC-BUTYL ZIMATE | 1.2 | 1.2 | 1.2 | 1.2 | 1.2 | 1.2 | 1.2 |
| ZnEDC | 1 | 1 | 1 | 1 | 1 | 1 | 1 |
| Total | 500.2 | 500.2 | 500.2 | 515.2 | 510.2 | 505.2 | 500.2 |

FIG. 4 depicts the Mooney viscosity [ML(1+4) 100° C.] (FIG. 4a), Mooney Scorch expressed as time for the Mooney viscosity to rise by 5 units (T5) at 125° C. (FIG. 4b), and cure time for reaching 90% vulcanization curve (T90) at 180° C. (FIG. 4c) for each of Samples 1-3 and Samples 1a-3a compared with the second comparative example. FIG. 2 depicts the tensile strength at break and tensile strength retention after aging for each of Samples 1-3 and Samples 1a-3a compared with the second comparative example. FIG. 3 depicts the compression set at 25% deflection (%) at (70° C., 22 h), (70° C., 168 h), (100° C., 72 h) and (125° C., 72 h) for Samples 1-3 and Samples 1a-3a compared with the second comparative example.

As shown in FIGS. 1-6, the addition of a polyolefin elastomer into compositions comprising EPDM reduced the Mooney viscosity [ML(1+4) 100° C.] by about 0 to about 15 compared with the composition without the polyolefin elastomer. This allows flowability of the material to increase, thus making the follow-up extrusion process easier and more efficient. There was also a slight increase in Mooney Scorch and cure time. In addition, while decreased tensile strength at break and increased compression set at 25% deflection were observed, both turned out to be within a very limited range, indicating no significant difference in terms of property loss.

Various terms have been defined above. To the extent a term used in a claim is not defined above, it should be given the broadest definition persons in the pertinent art have given that term as reflected in at least one printed publication or issued patent. Furthermore, all patents and patent applications, test procedures (such as ASTM methods), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention has been described above with reference to numerous embodiments and specific examples. Many variations will suggest themselves to those skilled in this art in light of the above detailed description. All such obvious variations are within the full intended scope of the appended claims.

What is claimed is:

1. A composition comprising:
   (a) an ethylene-propylene-diene terpolymer having a Mooney viscosity [ML(1+4) 125° C.] of about 25 to about 300 and an ethylene content of at least about 60 wt % of the ethylene-propylene-diene terpolymer; and
   (b) a polyolefin elastomer comprising at least about 60 wt % propylene-derived units and from about 5 to about 25 wt % ethylene-derived units, based on total weight of the polyolefin elastomer, and having a heat of fusion of less than about 80 J/g and an elongation at break of at least about 100% as determined by ASTM D412.

2. The composition of claim 1, wherein the ethylene-propylene-diene terpolymer is present in an amount of about 10 to about 50 wt % of the composition.

3. The composition of claim 2, wherein the polyolefin elastomer has a melt flow rate (ASTM D1238, 2.16 kg, 230° C.) of about 2 g/10 min to about 20 g/10 min.

4. The composition of claim 1, wherein the polyolefin elastomer is present in an amount of less than about 150 phr relative to the ethylene-propylene-diene terpolymer.

5. The composition of claim 1, wherein the polyolefin elastomer is present in an amount of less than about 100 phr relative to the ethylene-propylene-diene terpolymer.

6. The composition of claim 1, wherein the polyolefin elastomer is present in an amount of less than about 50 phr relative to the ethylene-propylene-diene terpolymer.

7. The composition of claim 1, wherein the polyolefin elastomer is present in an amount of less than about 20 phr relative to the ethylene-propylene-diene terpolymer.

8. The composition of claim 1, further comprising at least one of a filler, a processing aid, a curing agent, and an accelerator.

9. The composition of claim 1, further comprising sulfur.

10. The composition of claim 9, wherein the sulfur is present in an amount of less than 5 phr relative to the ethylene-propylene-diene terpolymer.

11. The composition of claim 1, further comprising a sulfur donor.

12. The composition of claim 1, wherein the sulfur donor comprises at least one of tetramethylthiuram disulfide and dipentamethylenethiuram tetrasulfide.

13. The composition of claim 11, wherein the sulfur donor is present in an amount of less than 5 phr relative to the ethylene-propylene-diene terpolymer.

14. The composition of claim 1, wherein the composition has a Mooney viscosity [ML(1+4) 100° C.] about 0 to about 15 lower than the Mooney viscosity [ML(1+4) 100° C.] of a composition free of the polyolefin elastomer but is otherwise identical in terms of its constituents.

15. The composition of claim 1, wherein the composition has at least one of the following properties:
   (i) a tensile strength at break at most about 15% lower than the tensile strength at break of a composition free of the polyolefin elastomer but is otherwise identical in terms of its constituents; and
   (ii) a compression set at most about 30% higher than the compression set of a composition free of the polyolefin elastomer but is otherwise identical in terms of its constituents.

16. A method for preparing a composition, comprising the steps of:
   (a) combining (i) an ethylene-propylene-diene terpolymer having a Mooney viscosity [ML(1+4) 125° C.] of about 25 to about 300 and an ethylene content of at least about 60 wt % of the ethylene-propylene-diene terpolymer with (ii) a polyolefin elastomer comprising at least about 60 wt % propylene-derived units and from about 5 to about 25 wt % ethylene-derived units, based on total weight of the polyolefin-based elastomer, and having a heat of fusion of less than about 80 J/g and an elongation at break of at least about 100% as determined by ASTM D412, and
   (b) forming the composition.

17. The method of claim 16, further comprising the step of forming the composition into an article.

18. The method of claim 16, wherein the composition has a Mooney viscosity [ML(1+4) 100° C.] about 0 to about 15 lower than the Mooney viscosity [ML(1+4) 100° C.] of a composition free of the polyolefin elastomer but is otherwise identical in terms of its constituents.

19. The method of claim 16, wherein the composition has at least one of the following properties:
   (i) a tensile strength at break at most about 15% lower than the tensile strength at break of a composition free of the polyolefin elastomer but is otherwise identical in terms of its constituents; and
   (ii) a compression set at most about 30% higher than the compression set of a composition free of the polyolefin elastomer but is otherwise identical in terms of its constituents.

20. An article comprising the composition of claim 1.

21. The article of claim 20, wherein the article is an extruded article, molded article, hose, sheet, film, or jacket.

22. A composition comprising:
   (a) an ethylene-propylene-diene terpolymer in an amount of about 20 to about 25 wt % of the composition having a Mooney viscosity [ML(1+4) 125° C.] of about 60 to about 90 wt %, and an ethylene content of about 60 to about 75 wt % of the ethylene-propylene-diene terpolymer;
   (b) a propylene-based elastomer in an amount of about 5 to about 15 phr relative to the ethylene-propylene-diene terpolymer, comprising at least 60 wt % propylene and about 5 to about 25 wt % ethylene, based on total weight of the propylene-based elastomer, wherein the propylene-based elastomer has a heat of fusion of less than about 80 J/g and an elongation at break of at least about 100% as determined by ASTM D412;
   (c) sulfur in an amount of about 0.5 phr relative to the ethylene-propylene-diene terpolymer;
   (d) tetramethylthiuram disulfide in an amount of about 1 phr relative to the ethylene-propylene-diene terpolymer; and
   (e) dipentamethylenethiuram tetrasulfide in an amount of about 1.5 phr relative to the ethylene-propylene-diene terpolymer.

23. A method for reducing the Mooney viscosity of a composition, comprising the steps of:
   (a) combining (i) an ethylene-propylene-diene terpolymer having a Mooney viscosity [ML(1+4) 125° C.] of about 25 to about 300 and an ethylene content of at least about 60 wt % of the ethylene-propylene-diene terpolymer with (ii) a polyolefin elastomer having an elongation at break of at least about 100% as determined by ASTM D412, and
   (b) forming the composition, wherein the composition formed has a Mooney viscosity [ML(1+4) 100° C.] about 0 to about 15 lower than the Mooney viscosity [ML(1+4) 100° C.] of a composition free of the polyolefin elastomer but is otherwise identical in terms of its constituents.

* * * * *